US008362671B2

(12) United States Patent
Taniguchi et al.

(10) Patent No.: US 8,362,671 B2
(45) Date of Patent: Jan. 29, 2013

(54) MOTOR APPARATUS WITH VOLTAGE STEP-UP FUNCTION

(75) Inventors: Makoto Taniguchi, Oobu (JP); Asuka Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 485 days.

(21) Appl. No.: 12/654,508

(22) Filed: Dec. 22, 2009

(65) Prior Publication Data
US 2010/0181948 A1    Jul. 22, 2010

(30) Foreign Application Priority Data

Jan. 16, 2009  (JP) ................................. 2009-007805

(51) Int. Cl.
H02K 1/16 (2006.01)
(52) U.S. Cl. ............................ 310/216.097; 310/216.091
(58) Field of Classification Search .................. 310/214, 310/216.005, 216.072, 216.091, 216.097
See application file for complete search history.

(56) References Cited

U.S. PATENT DOCUMENTS

| | | | |
|---|---|---|---|
| 6,137,704 | A | 10/2000 | Ito et al. |
| 6,448,680 | B1* | 9/2002 | Akemakou ............... 310/156.41 |
| 7,081,697 | B2* | 7/2006 | Neet ...................... 310/216.011 |
| 7,385,331 | B2* | 6/2008 | Sadiku et al. ................ 310/179 |
| 2008/0197743 | A1 | 8/2008 | Matsubara |
| 2008/0278102 | A1* | 11/2008 | Taniguchi ............... 318/400.27 |

FOREIGN PATENT DOCUMENTS

| | | |
|---|---|---|
| JP | A-10-337047 | 12/1998 |
| JP | A-2000-184633 | 6/2000 |
| JP | A-2002-335642 | 11/2002 |
| JP | A-2004-274807 | 9/2004 |
| JP | A-2008-295179 | 12/2008 |
| JP | A-2008-306914 | 12/2008 |
| WO | WO2005/122361 A1 | 12/2005 |

OTHER PUBLICATIONS

Oct. 2, 2012 Office Action issued in Japanese Patent Application No. 2009-007805 (with English Translation).

* cited by examiner

*Primary Examiner* — Dang Le
(74) *Attorney, Agent, or Firm* — Oliff & Berridge, PLC

(57) ABSTRACT

The motor of the motor apparatus includes a rotor including a plurality of magnetic poles and a stator formed with tooth portions radially extending with a pitch equal to 5/6 times or 7/6 times a pole pitch of the rotor. Each tooth portion is formed with a brim portion circumferentially extending from both circumferential sides of the tooth portion. The phase ends of the stator winding are connected respectively to the AC ends. The DC power supply is connected between one of the DC ends and the neutral point of the stator winding. The control section controls the multi-phase inverter such that a multi-phase AC current containing a DC component flows through the stator winding. The circumferential width of the brim portion is smaller than or equal to 0.75 times a cross-sectional size of the electric wires constituting the stator winding.

27 Claims, 9 Drawing Sheets

CIRCUMFERENTIAL DIRECTION

MOTOR APPARATUS WITH VOLTAGE STEP-UP FUNCTION

CROSS-REFERENCE TO RELATED APPLICATION

This application is related to Japanese Patent Application No. 2009-7805 filed on Jan. 16, 2009, the contents of which are hereby incorporated by reference.

BACKGROUND OF THE INVENTION

1. Field of the Invention

The present invention relates to a motor apparatus with a voltage step-up function including a motor and an inverter.

2. Description of Related Art

Such a motor apparatus with a voltage step-up function is known, for example, from Japanese Patent Application Laid-open No. 2008-306914. This motor apparatus includes a capacitor, a three-phase inverter, a three-phase motor and a battery. The three-phase inverter includes DC ends and AC ends. The DC ends of the three-phase inverter are connected to the capacitor. The three-phase motor includes a star-connected three-phase winding. The respective phase ends of the three-phase winding are connected to the AC ends of the three-phase inverter. The positive and negative terminals of the battery are connected between one of the DC ends of the three-phase inverter and the neutral point of the three-phase winding. The three-phase inverter is controlled so that AC phase currents each containing a DC component flow through the respective phase windings. As a result, the DC voltage of the battery is stepped up, and supplied to the capacitor, while the three-phase motor generates torque depending on the voltage supplied from the capacitor.

Incidentally, the torque instantaneous value T of the three-phase motor is determined by the induced voltages and the phase currents of its respective phases as shown by the equation 1.

$$T = k \cdot (Eu \cdot iu + Ev \cdot iv + Ew \cdot iw)$$

where Eu, Ev and Ew are the instantaneous values of the induced phase voltages, iu, iv and iw are the instantaneous values of the phase currents, and k is a constant vale concerned about torque.

The induced voltage of each phase contains a third-order harmonic component other than its fundamental component. Also, each phase current contains a DC component. Accordingly, the torque instantaneous value T of the three-phase motor contains a torque ripple depending on the third-order harmonic component of each induced voltage and the DC component of each phase current.

$$T \propto (Eu0+E3rd) \cdot (iu0+i0) + (Ev0+E3rd) \cdot (iv0+i0) + (Ew0+E3rd) \cdot (iw0+i0) = Eu0 \cdot iu0 + Ev0 \cdot iv0 + Ew0 \cdot iv0 + E3rd \cdot (iu0+iv0+iw0) + i0 \cdot (Eu0+Ev0+Ew0) + 3 \cdot E3rd \cdot i0 = Eu0 \cdot iu0 + Ev0 \cdot iv0 Ew0 \cdot iw0 + 3 \cdot E3rd \cdot i0$$
$$(\because iu0+iv0+iw0=0, Eu0+Ev0+Ew0=0)$$

where Eu0, Ev0 and Ew0 are the basis components of the induced phase voltages, iu0, iv0 and iw0 are the basic components of the phase currents, E3rd is a third order component of the induced voltages, and i0 is an offset component of the phase currents.

Japanese Patent Application Laid-open No. 2000-184633 discloses a brushless DC motor as a motor capable of reducing its torque ripple. This brushless DC motor includes a stator core in which a part of the front end of each of its tooth portions is cut, so that concentration of magnetic flux is lessened to reduce the torque ripple.

Incidentally, the technique to reduce the torque ripple by cutting a part of the front end of each of the tooth portions of a stator core is effective only when respective phase currents are symmetric to one another. Accordingly, the torque ripple increases to the contrary when this technique is applied to a motor in which each of its phase currents contains a DC component. Hence, there is a technical challenge that the torque ripple cannot be reduced for a motor in which AC currents each containing a DC component are passed to its phase windings as phase currents.

SUMMARY OF THE INVENTION

The present invention provides a motor apparatus with a voltage step-up function comprising:
a capacitor;
a multi-phase inverter including DC ends and AC ends, the DC ends being connected across the capacitor;
a multi-phase motor including a rotor having a plurality of magnetic poles and a stator formed with tooth portions radially extending with a pitch equal to 5/6 times or 7/6 times a pole pitch of the rotor,
each of the tooth portions being formed with a brim portion circumferentially extending from both circumferential sides of the tooth portion at one end of the tooth portion on the side facing the rotor,
the stator having a stator winding including a plurality of star-connected phase windings each being constituted of electric wires concentratedly wound around the tooth portions, phase ends of the stator winding being connected respectively to the AC ends;
a DC power supply connected between one of the DC ends and a neutral point of the stator winding; and
a control section which controls the multi-phase inverter such that a multi-phase AC current containing a DC component flows through the stator winding;
wherein a circumferential width of the brim portion is smaller than or equal to 0.75 times a cross-sectional size of the electric wires constituting the stator winding.

The present invention also provides a motor apparatus with a voltage step-up function comprising:
a capacitor;
a multi-phase inverter including DC ends and AC ends, the DC ends being connected across the capacitor;
a multi-phase motor including a rotor having a plurality of magnetic poles and a stator formed with tooth portions radially extending with a pitch equal to 5/6 times or 7/6 times a pole pitch of the rotor,
each of the tooth portions being formed with a brim portion circumferentially extending from both circumferential sides of the tooth portion at one end of the tooth portion on the side facing the rotor,
the stator having a stator winding including a plurality of star-connected phase windings each being constituted of electric wires concentratedly wound around the tooth portions, phase ends of the stator winding being connected respectively to the AC ends;
a DC power supply connected between one of the DC ends and a neutral point of the stator winding; and
a control section which controls the multi-phase inverter such that a multi-phase AC current containing a DC component flows through the stator winding;
wherein a circumferential width of the tooth portion including the brim portions at one end thereof facing the rotor is smaller than or equal to 1.13 times a circumferential width of the tooth portion at the other end thereof opposite to the rotor.

The present invention also provides a motor apparatus with a voltage step-up function comprising:

a capacitor;

a multi-phase inverter including DC ends and AC ends, the DC ends being connected across the capacitor;

a multi-phase motor including a rotor having a plurality of magnetic poles and a stator formed with tooth portions radially extending with a pitch equal to 5/6 times or 7/6 times a pole pitch of the rotor, each of the tooth portions being formed with a brim portion circumferentially extending from both circumferential sides of the tooth portion at one end of the tooth portion on the side facing the rotor, the stator having a stator winding including a plurality of star-connected phase windings each being constituted of electric wires concentratedly wound around the tooth portions, phase ends of the stator winding being connected respectively to the AC ends;

a DC power supply connected between one of the DC ends and a neutral point of the stator winding; and a control section which controls the multi-phase inverter such that a multi-phase AC current containing a DC component flows through the stator winding;

wherein a circumferential width of an opening between the brim portions circumferentially adjacent to each other is larger than or equal to 3 times a radial size of a clearance between the surface of the rotor and an end surface of the tooth portion.

According to the present invention, there is provided a motor apparatus with a voltage step-up function capable of sufficiently reducing the torque ripple of a motor which is supplied with phase currents each containing a DC component.

Other advantages and features of the invention will become apparent from the following description including the drawings and claims.

PREFERRED EMBODIMENTS OF THE INVENTION

First Embodiment

The first embodiment of the invention is an example in which the motor apparatus with a voltage step-up function 1 (may be referred to simply as the motor apparatus 1 hereinafter) of the invention is applied to an electric power steering device mounted on a vehicle.

Figure 1:
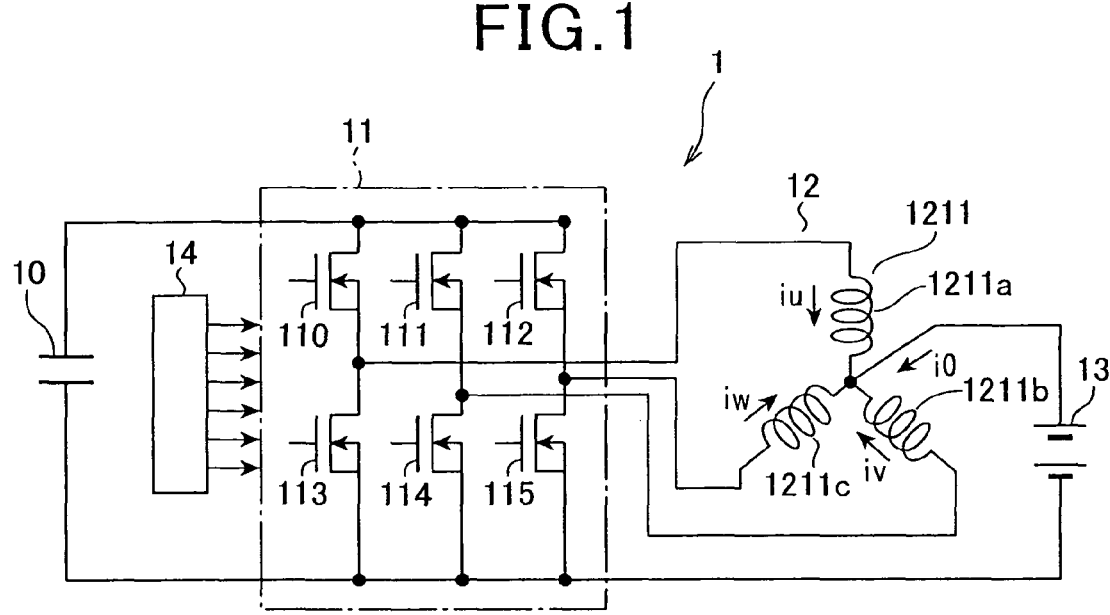
FIG. 1 is a circuit diagram of a motor apparatus with a voltage step-up function of a first embodiment of the invention.
Figure 2:
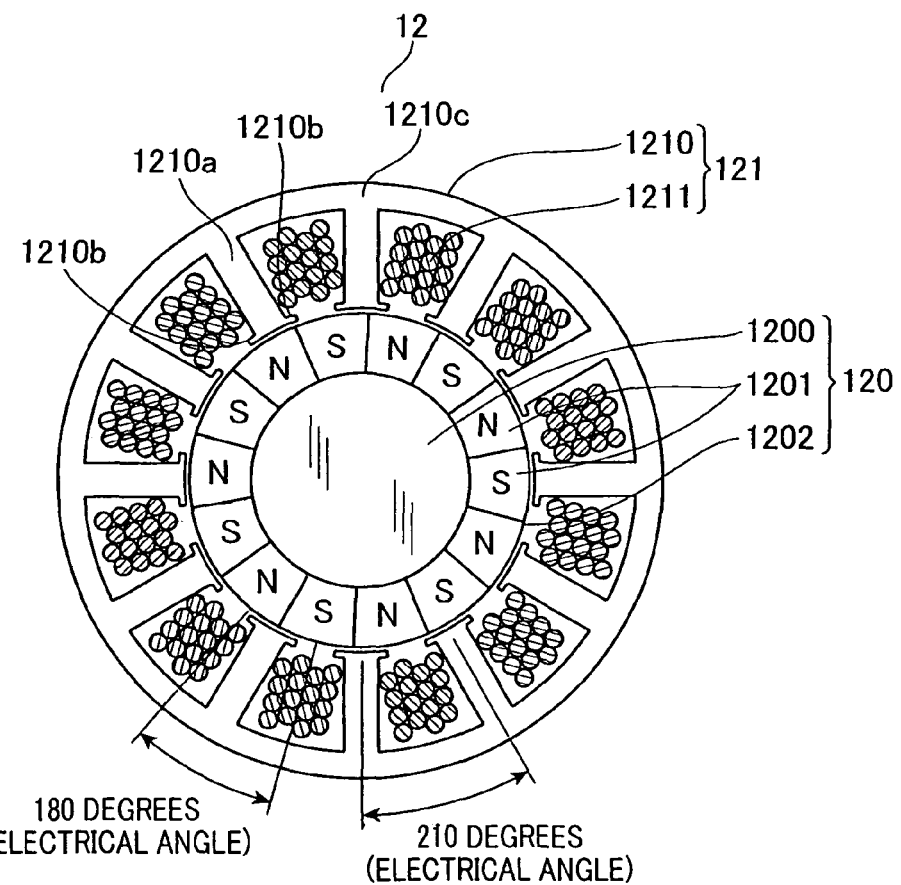
FIG. 2 is a cross-sectional view showing the internal structure of a three-phase motor included in the motor apparatus.
Figure 3:
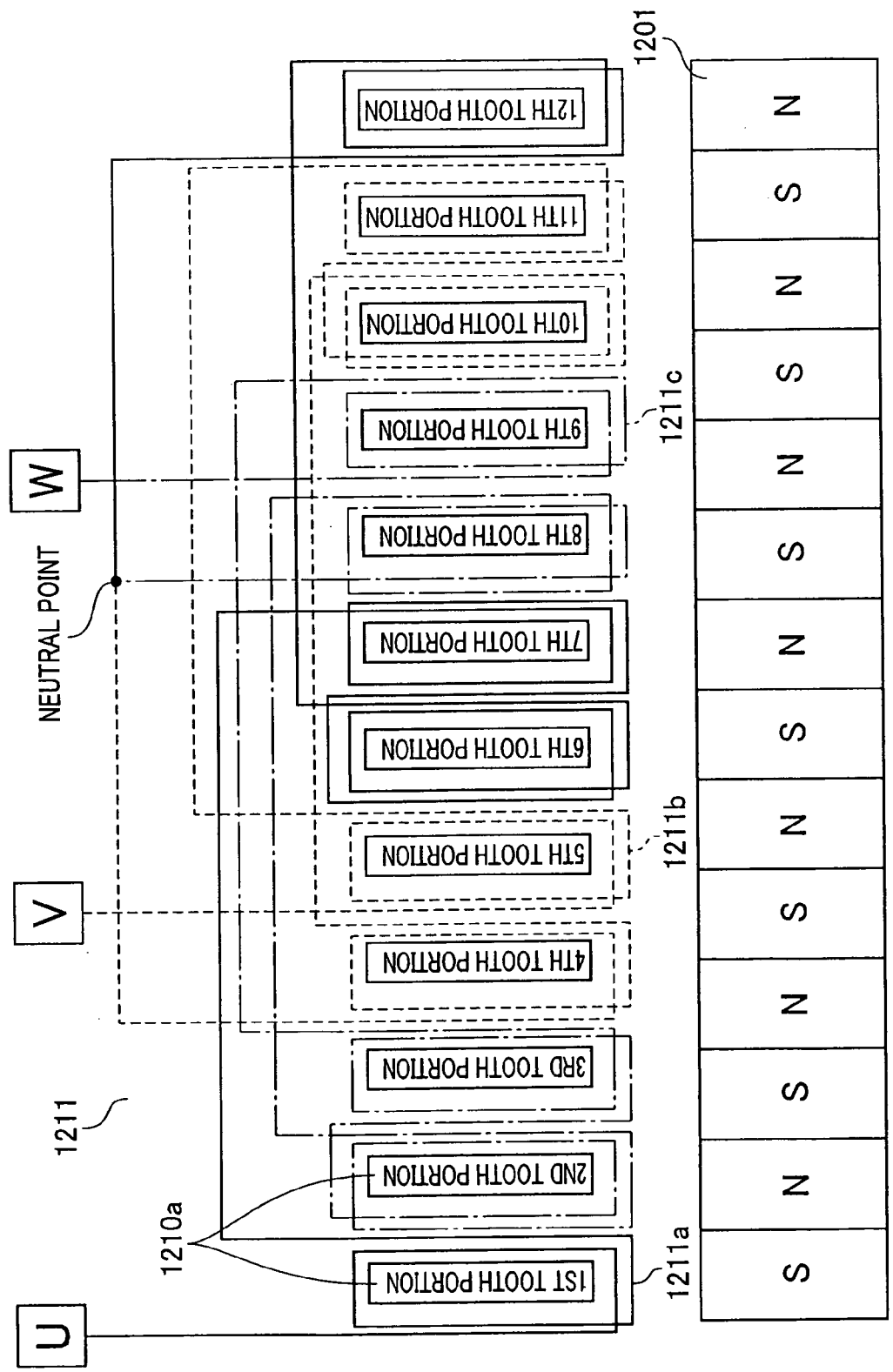
FIG. 3 is a development view of a stator coil of the three-phase motor.
Figure 4:
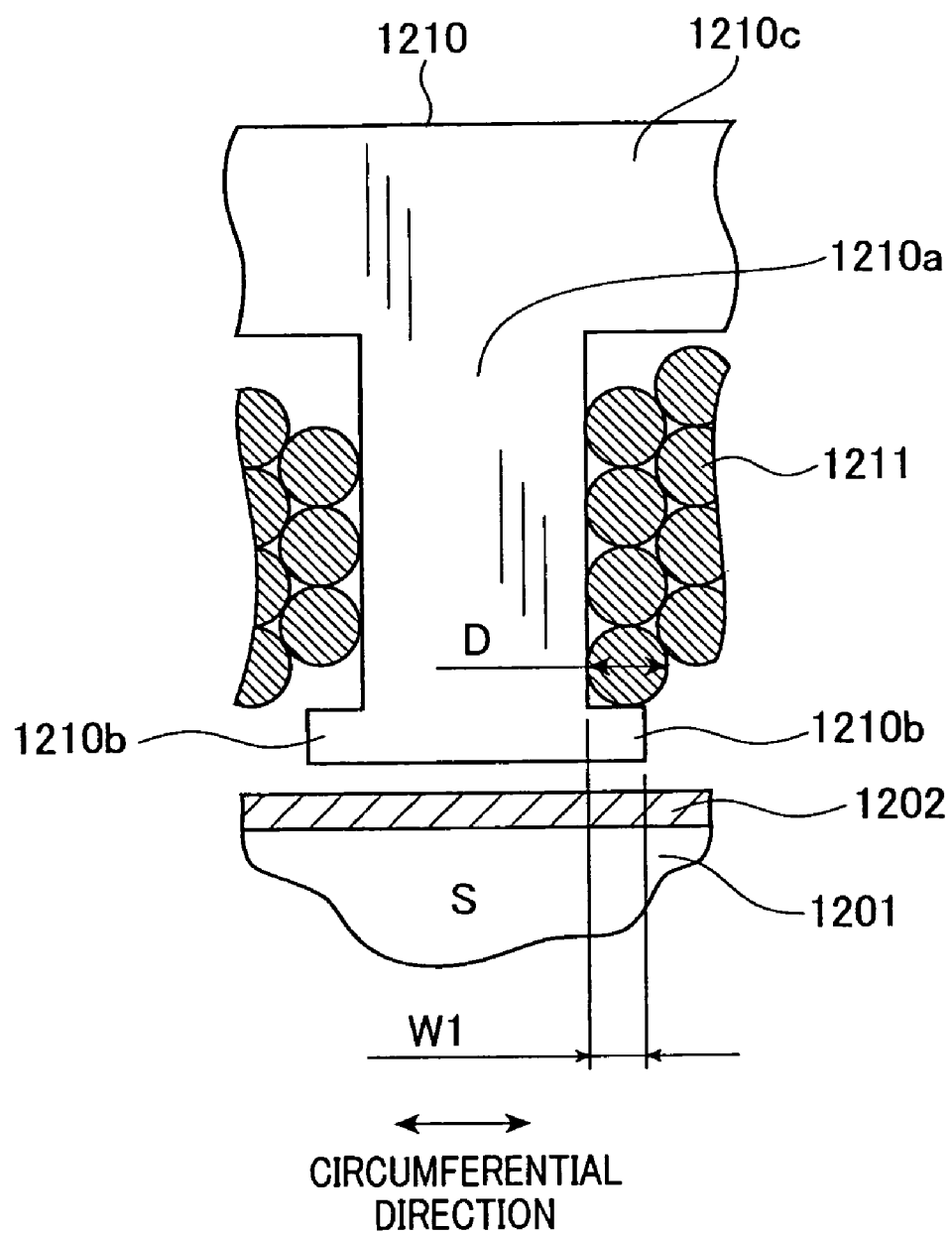
FIG. 4 is a schematic enlarged view of a stator of the three-phase motor showing one of tooth portions of the stator and its vicinity.

First, the structure of the motor apparatus 1 is explained. FIG. 1 is a circuit diagram of the motor apparatus 1 of the first embodiment. FIG. 2 is a cross-sectional view showing the internal structure of a three-phase motor 12 included in the motor apparatus 1. FIG. 3 is a development view of a stator coil of the three-phase motor 12. FIG. 4 is a schematic enlarged view of a stator of the three-phase motor 12 showing one of the tooth portions of the stator and its vicinity.

As shown in FIG. 1, the motor apparatus 1 includes a capacitor 10, a multi-phase inverter (a three-phase inverter in this embodiment) 11, a multi-phase motor (three-phase motor in this embodiment) 12, a battery 13 as a DC power supply, and a control circuit 14.

The capacitor 10 is a component for supplying a DC voltage to drive the three-phase motor 12 to the three-phase inverter 11. The capacitor 10 is charged with the DC voltage of the battery 13 which has been stepped up. The capacitor 10 is connected to the three-phase inverter 11.

The three-phase inverter 11 is a device which converts the DC voltage of the battery 13 into a three-phase AC voltage, and supplies this three-phase AC voltage to the three-phase motor 12. The three-phase inverter 11 is also a device which steps up the DC voltage of the battery 13, and supplies this stepped up DC voltage to the capacitor 10. The three-phase inverter 11 is constituted of MOSFETs 110 to 115.

The MOSFETs 110 to 115 are switching elements which convert the DC voltage of the capacitor 10 into the three-phase AC voltage by being turned on and off. The MOSFETs 110 to 115 are also switching elements which step up the DC voltage of the battery 13 by use of the three-phase motor 12. The MOSFETs 110 and 113 are connected in series. The MOSFETs 111 and 114 are connected in series. The MOSFETs 112 and 115 are connected in series. In more detail, the sources of the MOSFETs 110 to 112 are connected respectively to the drains of the MOSFETs 113 to 115. The three pairs of the MOSFETs 110 and 113, MOSFETs 111 and 114, and MOSFETs 112 and 115 are connected in parallel to one another. The drains of the MOSFETs 110 to 112 constitute high DC voltage ends of the three-phase inverter 11, and connected to one terminal of the capacitor 10. The sources of the MOSFETs 113 to 115 constitute low DC voltage ends of the three-phase inverter 11, and connected to the other terminal of the capacitor 10. The gates of the MOSFETs 110 to 115 are connected to the control circuit 14. The series connection points between the MOSFETs 110 and 113, between the MOSFETs 111 and 114, and between the MOSFETs 112 and 115 constitute the AC ends of the three-phase inverter 11, and are respectively connected to the U-phase, V-phase and W-phase ends of the three-phase motor 12.

The three-phase motor 12 is for generating a driving force (via a shaft (not shown)) to assist a steering operation of a steering wheel of the vehicle when supplied with a three-phase AC current. In this embodiment, the motor 12 is a surface magnet type synchronous motor. As shown in FIG. 2, the three-phase motor 12 includes a rotor 120 and a stator 121.

The rotor 120 is a member which constitutes a part of a magnetic path, and generates magnetic flux. The rotor 120 generates torque to rotate by the self-generated flux which links with a rotating flux of the stator 121. The rotor 120 includes a rotor core 1200, a rotor magnet member 1201 including permanent magnets, and a protection cover 1202.

The rotor core 1200 is a column-shaped member which constitutes a part of the magnetic path, and holds the rotor magnet member 1201.

The rotor magnet member 1201 is a cylindrical member made of ferrite or rare metal like neodymium alloy, for example, which generates flux. The rotor magnet member 1201 is fixed to the outer periphery of the rotor core 1200. The circumference surface of the rotor magnet member 1201 is magnetized so that 14 magnetic poles are disposed at even intervals in the circumferential direction. In more detail, the circumference surface is magnetized in the radial direction so that the circumferentially adjacent magnetic poles have different polarities. In this embodiment, the pole pitch is 180 degrees in electrical angle.

The protection cover 1202 is a thin-plate cylindrical member made of non-magnetic material provided for protecting the outer surface of the rotor magnet member 1201. The protection cover 1202 is fixed to cover the outer surface of the rotor magnet member 1201.

The stator 121 is a member which generates a rotating flux when supplied with a three-phase AC current. The rotating flux links with the flux generated by the rotor 120, as a result of which the rotor 120 generates torque to rotate. The stator 121 includes a stator core 1210 and a stator winding 1211.

The stator core 1210 is a member constituting a part of the magnetic path, which is made of, for example, laminated silicon steel plates. The stator core 1210 is constituted of tooth portions 1210a, brim portions 120b and a cylinder portion 1210c.

The tooth portions 1210a are 12 roughly rectangular parallelepiped portions which radially extend to radially face the outer periphery surface of the rotor 120, and have a uniform circumferential width. Although the pole pitch of the rotor 120 is 180 degrees in electrical angle, the tooth portions 1210a are disposed with a pitch of 210 degrees in electrical angle. That is, the tooth portions 1210a are disposed so as to radially extend with a pitch equal to 7/6 times the pole pitch of the rotor 120.

The brim portion 1210b is a roughly parallelepiped portion which projects from both circumferential sides of the tooth portion 1210a on the inner side end of the tooth portion 1210a facing the rotor 120.

The cylindrical portion 1210c is a portion to which the outer end of each tooth portion 1210a is joined.

The stator winding 1211 is a member made of electric wires which generates flux when supplied with a three-phase AC current. In this embodiment, the stator winding is constituted of round electric wires having a circular cross section. As shown in FIG. 3, the stator winding 1211 includes a U-phase winding 1211a, a V-phase winding 1211b and a W-phase winding 1211c. The U-phase winding 1211a, which is shown by the solid line, is concentratedly wound around the first tooth portion 1210a counterclockwise, around the seventh tooth portion 1210a clockwise, around the sixth tooth portion 1210a counterclockwise, and around the twelfth tooth portion 1210a clockwise, respectively. The V-phase winding 1211b, which is shown by the broken line, is concentratedly wound around the fifth tooth portion 1210a counterclockwise, around the eleventh tooth portion 1210a clockwise, around the tenth tooth portion 1210a counterclockwise, and around the fourth tooth portion 1210a clockwise, respectively. The W-phase winding 1211b, which is shown by the chain line, is concentratedly wound around the ninth tooth portion 1210a counterclockwise, around the third tooth portion 1210a clockwise, around the second tooth portion 1210a counterclockwise, and around the eighth tooth portion 1210a clockwise, respectively. One end of the U-phase winding 1211a wound around the twelfth tooth portion 1210a, one end of the V-phase winding 1211b wound around the fourth tooth portion 1210a, and one end of the W-phase winding 1211c wound around the eighth tooth portion 1210a are connected to one another to form a neutral point.

As shown in FIG. 4, the circumferential width W1 of the brim portion 1210b is set to 0.75 times the wire diameter D of the round wires constituting the stator winding 1211.

The battery 13 shown in FIG. 1 is a DC power supply to supply a DC voltage to the capacitor 10. The DC voltage of the battery 13 is stepped up through the stator winding 1211 of the three-phase motor 12 and the three-phase inverter 11, and then supplied to the capacitor 10. The positive terminal of the battery 13 is connected to the neutral point of the stator winding 1211, and the negative terminal of the battery 13 is connected to the DC low voltage end of the three-phase inverter 11.

The control circuit 14 is a circuit which controls the three-phase inverter 11 such that a three-phase AC current containing a DC component flows through the stator winding 1211. In more detail, the control circuit 14 controls the three-phase inverter 11 such that a three-phase AC current containing a DC component offset to the negative side flows through the stator winding 1211. Accordingly, the DC voltage of the battery 13 is stepped up and supplied to the capacitor 10, as a result of which the three-phase motor 12 generates torque depending on the voltage supplied from the capacitor 10. The control circuit 14 is connected to the three-phase inverter 11.

Figure 5:
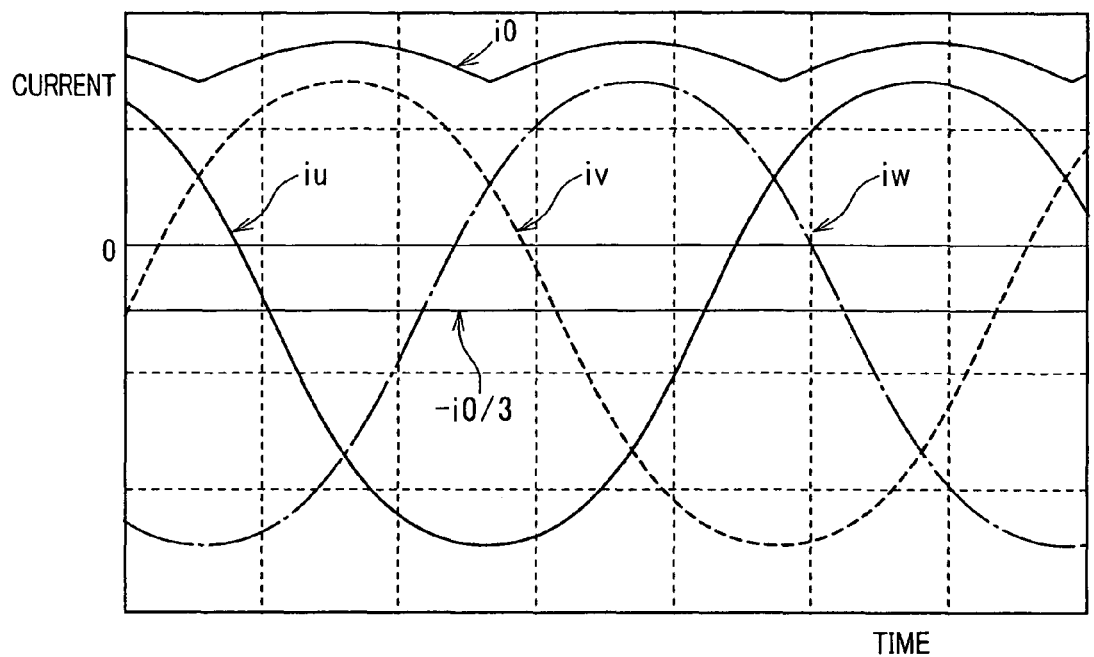
FIG. 5 is a graph showing the waveforms of the phase currents flowing through the stator winding.
Figure 6:
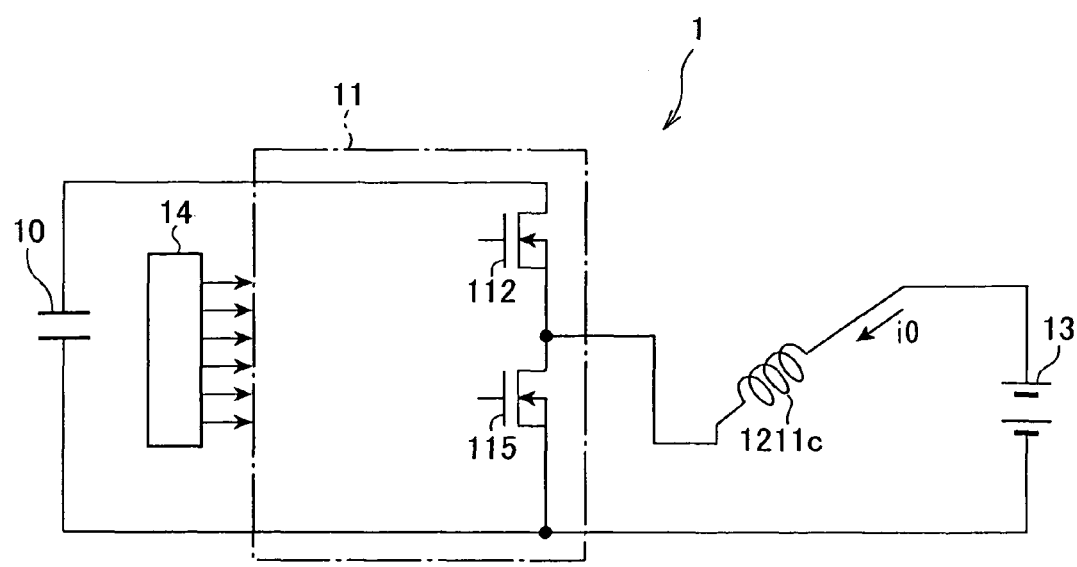
FIG. 6 is a circuit diagram for explaining the voltage step-up operation of the motor apparatus.
Figure 7:
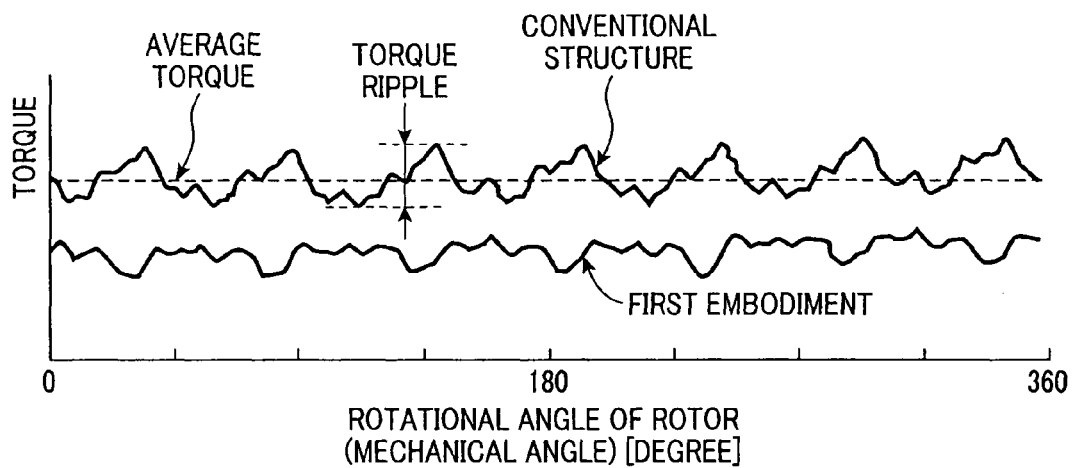
FIG. 7 is a graph showing the waveform of the torque generated by the three-phase motor.
Figure 8:
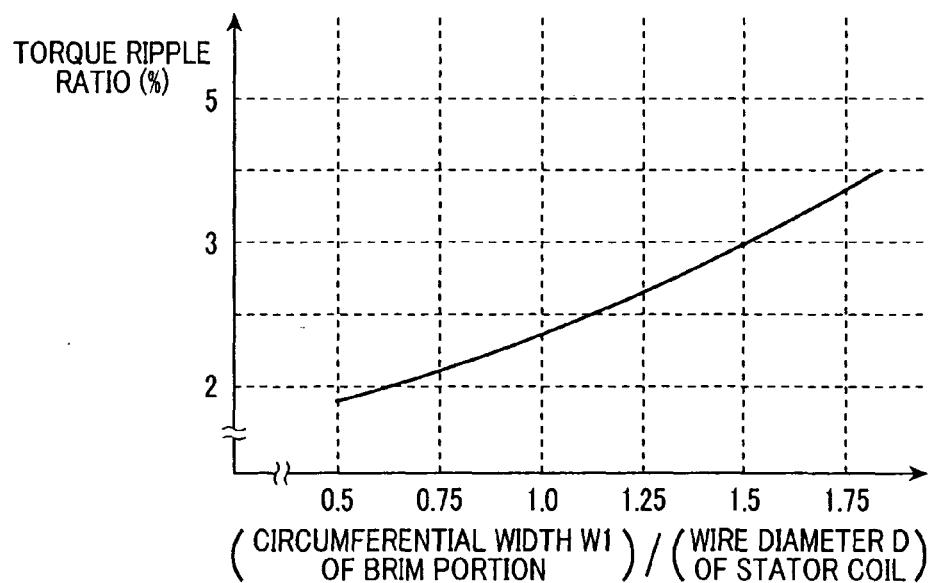
FIG. 8 is a graph showing a relationship between the torque ripple ratio and the ratio of the wire diameter of the stator winding to the circumferential width of the brim portion provided in the tooth portion.
Figure 9:
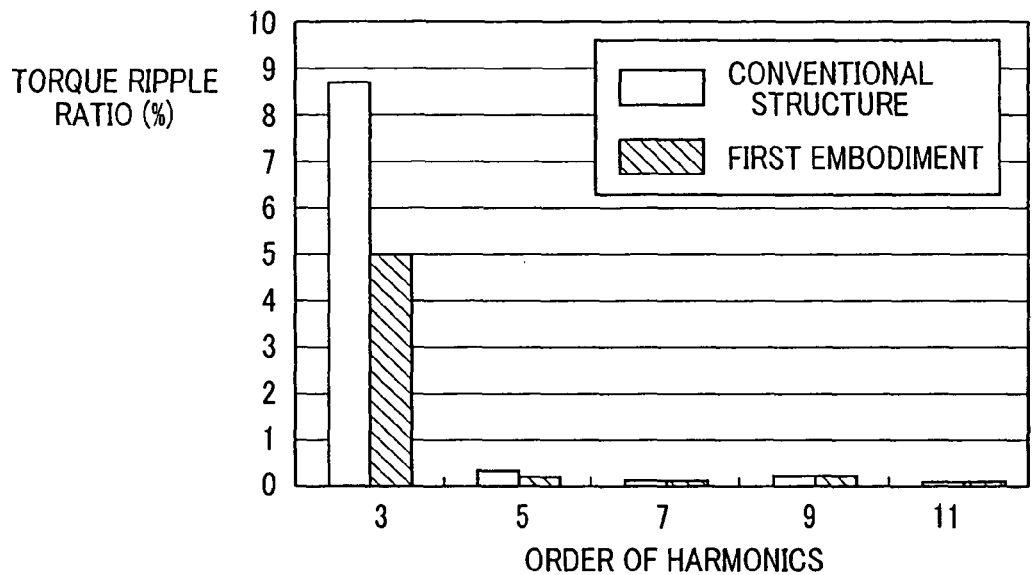
FIG. 9 is a graph showing comparison in torque ripple ratio between the first embodiment of the invention and a conventional structure.

Next, the operation of the motor apparatus 1 having the above described structure is explained with reference to FIGS. 1 and 4 to 9. FIG. 5 is a graph showing waveforms of the phase currents flowing through the stator winding. FIG. 6 is a circuit diagram for explaining the voltage step-up operation. FIG. 7 is a graph showing a waveform of the torque which the three-phase motor generates. FIG. 8 is a graph showing a relationship between the torque ripple ratio and the ratio of the wire diameter of the stator winding to the circumferential width of the brim portion. FIG. 9 is a graph showing comparison in torque ripple ratio between the first embodiment and a conventional structure.

The control circuit 14 controls the three-phase inverter 11 such that the phase currents iu, iv and iw each containing a DC component flow through the U-phase winding 1211a, V-phase winding 1211b and W-phase windings 1211c, respectively, as shown in FIG. 1. In more detail, the control circuit 14 on-off controls the MOSFETs 110 to 115 such that the phase currents iu, iv and iw each being offset by −i0/3 (i0 being a positive DC current) flow through the stator winding 1211. Accordingly, the DC current i0 flows from the battery 13 to the neutral point of the stator winding 1211.

More precisely, as shown in FIG. 5, currents each having a roughly sinusoidal waveform offset to the negative side flow through the stator winding. In FIG. 6, when attention is directed, for example, to the W-phase, when the MOSFET 115 is turned on, the DC current flows through the W-phase winding and accordingly magnetic energy is stored there. Next, when the MOSFET 115 is turned off, and the MOSFET 112 is turned on, the magnetic energy stored in the W-phase winding 1211$c$ is converted to electrostatic energy, and accordingly, a current continues to flow from the W-phase winding 1211$c$ to charge the capacitor 10. By performing this alternate switching at a sufficiently high frequency with respect to the operation frequency of the motor, for example, at 10 kHz, the DC voltage of the battery 13 is stepped up and supplied to the capacitor 10. Likewise, by performing such alternate switching on the MOSFETs 110 and 113, and on the MOSFETs 111 and 114, the capacitor 10 is charged by a current from the U-phase winding 1211$a$ and a current from the V-phase winding 1211$b$, respectively. As a result, the DC voltage of the battery 13 is stepped up and supplied to the capacitor 10, and also the three-phase motor 12 generates torque depending on the stepped up voltage from the capacitor 10.

As shown in FIG. 7, the torque which the three-phase motor 12 generates contains a ripple. As explained in the foregoing, this torque ripple is due to the third-order harmonic component of the induced voltage. In this embodiment, as shown in FIG. 4, the circumferential width W1 of the brim portion 1210$b$ is set to 0.75 times the wire diameter D of the round wires constituting stator winding 1211. As seen from FIG. 8, if the ratio of the wire diameter D of the stator winding 1211 to the circumferential width W1 of the brim portion 1210$b$ is set lower than or equal to 0.75, the torque ripple ratio can be reduced to a level not affecting the steering feeling of the electric power steering device. Here, the torque ripple is a ratio of the average torque to the torque ripple (see FIG. 7). As shown in FIGS. 7 and 9, according to this embodiment, the torque ripple due to the third-order harmonic component of the induced voltage can be reduced to approximately 60% of that in the conventional structure in which the circumferential width W1 of the brim portion 1210$b$ is equal to 1.75 times the wire diameter of the stator winding.

The first embodiment described above provides the following advantages. According to the first embodiment of the invention, it is possible to reduce the torque ripple of a three-phase motor for use in an electric power steering device, the three-phase motor being supplied with AC phase currents each containing a DC component. This makes it possible to improve the steering feeling of the electric power steering device.

In the first embodiment, the positive terminal and the negative terminal of the battery 13 are connected respectively to the neutral point of the stator winding 1211 and the DC low voltage end of the three-phase inverter 11, and the three-phase inverter 11 is controlled such that the stator winding 1211 is supplied with the three-phase AC current offset to the negative side. This makes it possible to step up the DC voltage of the battery 13, and supplies the stepped-up DC voltage to the capacitor 10.

In the first embodiment, the three-phase motor 12 is a surface magnet type synchronous motor including a rotor magnet member disposed on the surface of its rotor. Accordingly, it is possible to reduce the torque ripple also when the motor apparatus includes a surface magnet type synchronous motor.

Further, according to the first embodiment, it is possible to reduce the torque ripple when a three-phase AC current containing a DC component is passed to the stator of a three-phase motor in which the surface of the rotor magnet member is magnetized to form 14 magnetic poles although a large torque ripple is likely to occur in such a three-phase motor including a 14-pole rotor.

Second Embodiment

Next, a second embodiment of the invention is described. The motor apparatus of the second embodiment differs from the motor apparatus of the first embodiment in that instead of round wires, rectangular wires are used as the electric wires constituting the stator winding of the three-phase motor.

Figure 10:
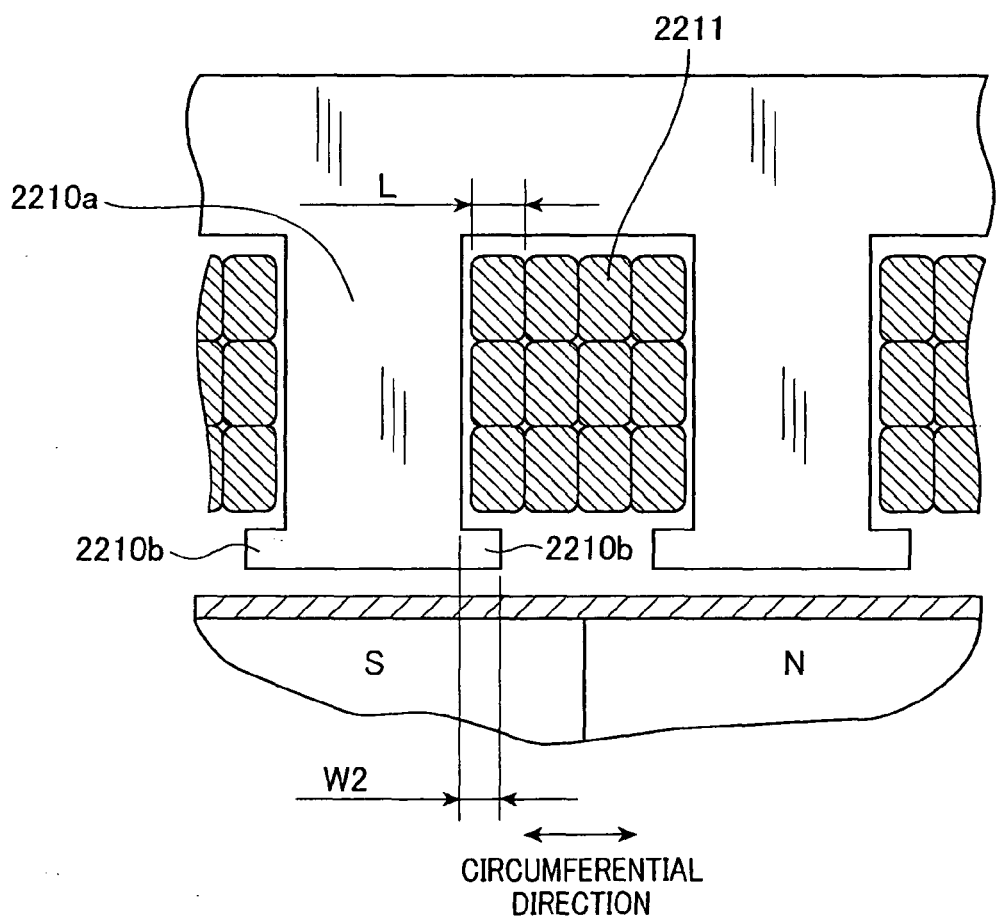
FIG. 10 is a schematic cross-sectional view showing the tooth portions of a three-phase motor included in a motor apparatus with a voltage step-up function of a second embodiment of the invention and their vicinity.

FIG. 10 is a schematic cross-sectional view showing the tooth portions of the three-phase motor of the second embodiment and their vicinity. Here, the explanation focuses on the difference with the first embodiment, that is, focuses on the structure of the three-phase motor.

As shown in FIG. 10, the stator winding 2211 is constituted of rectangular electric wires having a roughly rectangular cross section whose corners are rounded. The stator winding 2211 is concentratedly wound around each tooth portion 2210$a$ with its shorter sides being aligned along the circumferential direction. The circumferential width W2 of the brim portion 2210$b$ is set to 0.75 times the short side of the rectangular electric wire facing the brim portion 2210$b$.

Also in this embodiment, it is possible to reduce the torque ripple below a level not affecting the steering feeling of the electric power steering device like the first embodiment by setting the ratio of the circumferential width W2 of the brim portion 2210$b$ to the length L of the short sides of the stator winding 2211 lower than or equal to 0.75.

Third Embodiment

Next, a third embodiment of the invention is explained. In the motor apparatus of the third embodiment, the width of the tooth portion including the brim portion is determined with reference to the circumferential width of the tooth portion, unlike the first embodiment in which the circumferential width of the brim portion is determined with reference to the wire diameter.

Figure 11:
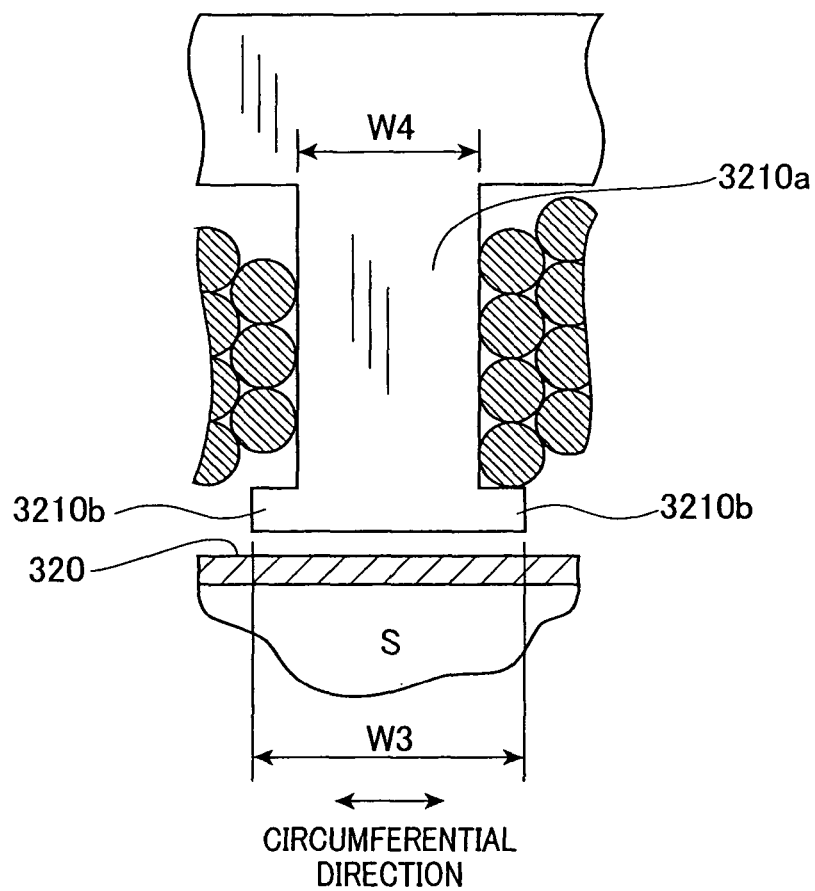
FIG. 11 is a schematic cross-sectional view showing one of the tooth portions of a three-phase motor included in a motor apparatus with a voltage step-up function of a third embodiment and its vicinity.
Figure 12:
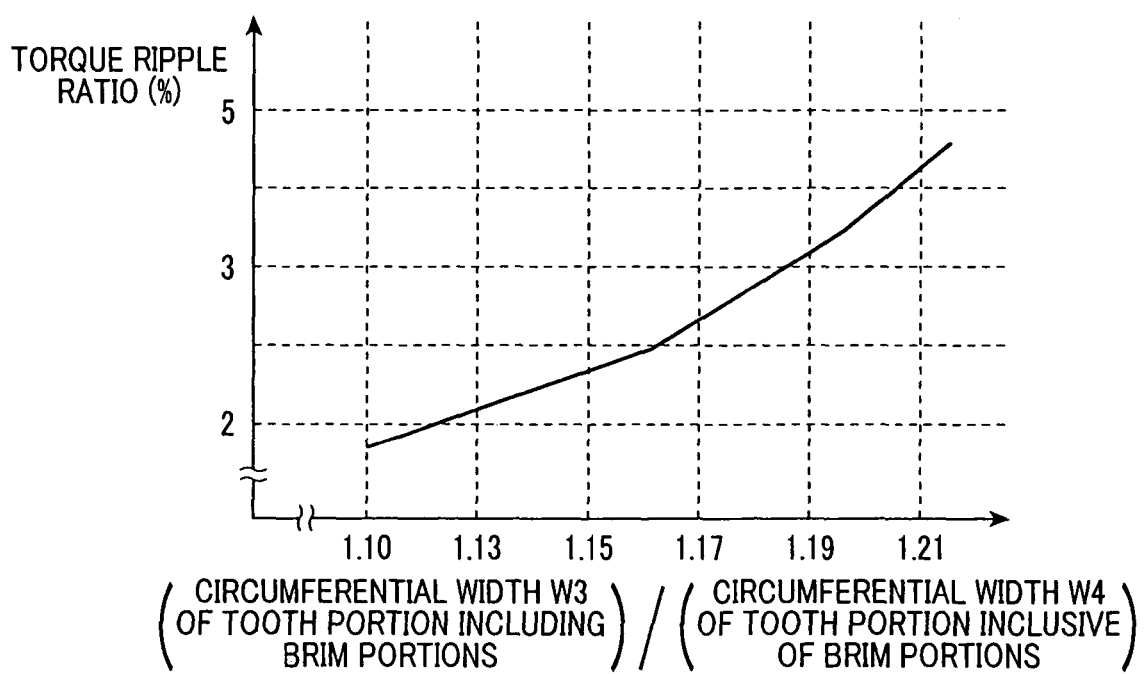
FIG. 12 is a graph showing a relationship between the torque ripple ratio and the ratio of the circumferential width of the tooth portion exclusive of the brim portions to the circumferential width of the tooth portion including the brim portions.

The structure and advantages of the three-phase motor of this embodiment are explained with reference to FIGS. 11 and 12. FIG. 11 is a schematic cross-sectional view showing the tooth portion of the three-phase motor of the third embodiment and its vicinity. FIG. 12 is a graph showing a relationship between the torque ripple ratio and the ratio of the circumferential width of the tooth portion exclusive of the brim portion to the circumferential width of the tooth portion inclusive of the brim portion. Here, the explanation focuses on the difference with the first embodiment, that is, focuses on the structure of the three-phase motor.

As shown in FIG. 11, the circumferential width W3 of the tooth portion 3210$a$ including the brim portion 3210$b$ on the side facing the rotor 320 is set to 1.13 times the circumferential width W4 of the tooth portion 3210$a$ on the side opposite to the rotor 320. As shown in FIG. 12, when the ratio of the circumferential width W3 of the tooth portion 3210$a$ including the brim portion 3210$b$ on the side facing the rotor 320 to the circumferential width W4 of the tooth portion 3210$a$ on the side opposite to the rotor 320 is set to lower than or equal to 1.13, it is possible to reduce the torque ripple below a level not affecting the steering feeling of the electric power steering device.

Hence, according to this embodiment, it is possible to reduce the torque ripple when a three-phase AC current containing a DC component is supplied to a three-phase motor of an electric power steering device, so that the steering feeling of the electric power steering device is not affected by the torque ripple.

Fourth Embodiment

Next, a fourth embodiment of the invention is described. In the motor apparatus of the fourth embodiment, the circumferential width of the opening between the brim portions of the adjacent tooth portions is determined with reference to the radial size of the clearance between the surface of the rotor magnet member 4201 and the end face of the tooth portion, unlike the first embodiment in which the circumferential width of the brim portion is determined with reference to the wire diameter.

Figure 13:
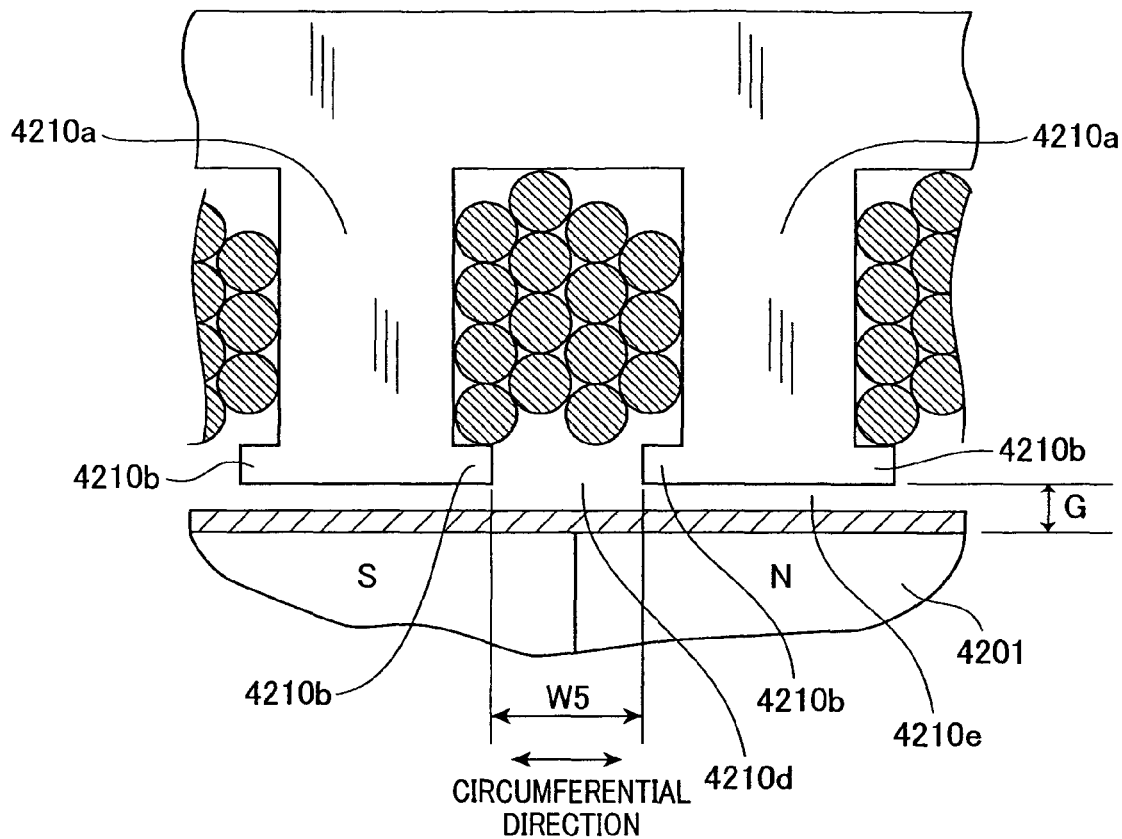
FIG. 13 is a schematic cross-sectional view showing the tooth portions of the three-phase motor of a fourth embodiment of the invention and their vicinity.
Figure 14:
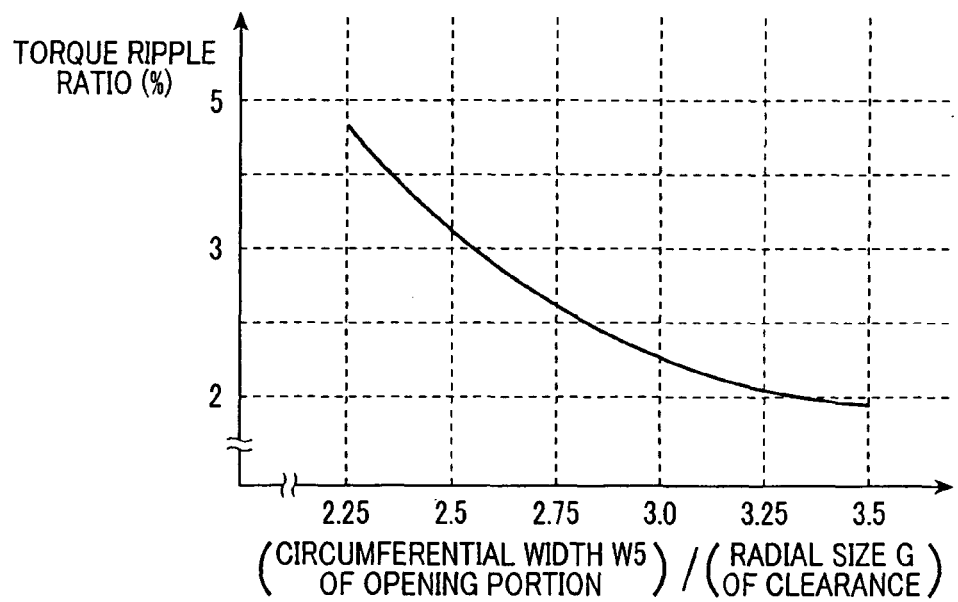
FIG. 14 is a graph showing a relationship between the torque ripple ratio and the ratio of the radial size of the clearance between the rotor surface and the tooth portion to the circumferential width of the opening portion between the adjacent brim portions.

The structure and advantages of the three-phase motor of this embodiment are explained with reference to FIGS. 13 and 14. FIG. 13 is a schematic cross-sectional view showing the tooth portions of the three-phase motor of the fourth embodiment and their vicinity. FIG. 14 is a graph showing a relationship between the torque ripple ratio and the ratio of the radial size of the clearance to the circumferential width of the opening portion. Here, the explanation focuses on the difference with the first embodiment, that is, focuses on the structure of the three-phase motor.

As shown in FIG. 13, the circumferential width W5 of the opening portion 4210d between the circumferentially adjacent brim portions 4210b is set to three times the radial size of the clearance 4210e between the surface of the rotor magnet member 4201 and the end face of the tooth portion 4210a. As shown in FIG. 14, when the ratio of the circumferential width W5 of the opening portion 4210d to the radial size G of the clearance 4210e is set to larger than or equal to 3, it is possible to reduce the torque ripple below a level not affecting the steering feeling of the electric power steering device.

Hence, according to this embodiment, it is possible to reduce the torque ripple when a three-phase AC current containing a DC component is supplied to a three-phase motor of an electric power steering device, so that the steering feeling of the electric power steering device is not affected by the torque ripple.

In this embodiment, the positive terminal and the negative terminal of the battery are connected respectively to the neutral point of the stator winding and the DC low voltage end of the three-phase inverter, and the three-phase inverter is controlled such that a three-phase AC current containing a DC component offset to the negative side flows through the stator winding. However, this embodiment may be modified such that the positive terminal and the negative terminal of the battery are connected respectively to the DC high voltage end of the three-phase inverter and the neutral point of the stator winding, and the three-phase inverter is controlled such that a three-phase AC current containing a DC component offset to the positive side flows through the stator winding. Also in this case, it is possible to step up DC voltage of the battery 13 and supplies it to the capacitor 10.

Figure 15:
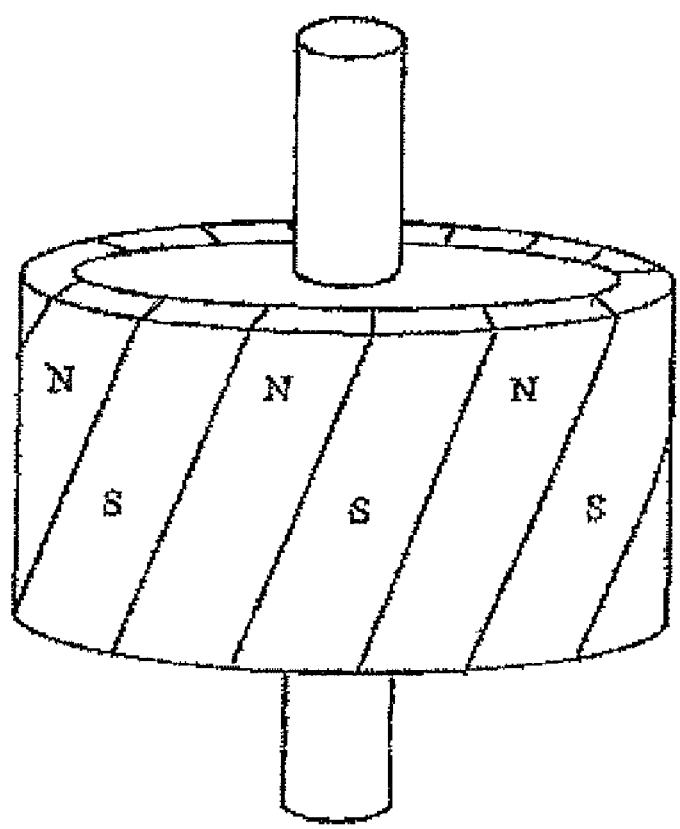
FIG. 15 is a schematic view showing skewed magnetic poles.

In this embodiment, the magnetic poles of the rotor magnet member is formed to extend straight in the axial direction. However, the magnetic poles may be skewed (See FIG. 15) to suppress the third-order harmonic component of the induced voltage. In this case, the torque ripple can be further reduced when a three-phase AC current containing a DC component is supplied to a three-phase motor.

In this embodiment, 14 magnet poles are formed on the surface of the rotor magnet member. However, this embodiment may be modified such that 10 magnet poles are formed on the surface of the rotor magnet member without changing the structure of the stator. In this case, the pole pitch of the rotor is 180 degrees in electrical angle, while the tooth portions extend radially with a pitch 150 degrees in electrical angle. That is, the tooth portions are disposed to extend radially with a pitch equal to 5/6 times the pole pitch of the rotor. In this structure, a large torque ripple is likely to occur as is the case with the 14-pole rotor According to this embodiment, it is possible to reduce the torque ripple also in the case where the three-phase motor includes a 10-pole rotor.

Although the above described embodiments are directed to motor control apparatuses including a three-phase motor and a three-phase inverter, the present invention is applicable to a motor apparatus with a voltage step-up function including a motor and an inverter of multi-phase structures other than three-phase structures.

What is claimed is:

1. A motor apparatus with a voltage step-up function comprising:
   a capacitor;
   a multi-phase inverter including DC ends and AC ends, said DC ends being connected across said capacitor;
   a multi-phase motor including a rotor having a plurality of magnetic poles and a stator formed with tooth portions radially extending with a pitch equal to 5/6 times or a 7/6 times a pole pitch of said rotor,
   each of said tooth portions being formed with a brim portion circumferentially extending from both circumferential sides of said tooth portion at one end of said tooth portion on the side facing said rotor,
   said stator having a stator winding including a plurality of star-connected phase windings each being constituted of electric wires concentratedly wound around said tooth portions, phase ends of said stator winding being connected respectively to said AC ends, the electric wires being wound around the tooth portions such that the electric wires are arranged in a plurality of rows in a circumferential direction of the stator between two of the brim portions adjacent to one another;
   a DC power supply connected between one of said DC ends and a neutral point of said stator winding; and
   a control section which controls said multi-phase inverter such that a multiphase AC current containing a DC component flows through said stator winding;
   wherein a circumferential width of said brim portion is smaller than or equal to 0.75 times a cross-sectional size of said electric wires constituting said stator winding.

2. The motor apparatus according to claim 1, wherein said electric wire is a round wire, and said circumferential width of said brim portion is smaller than or equal to 0.75 times a diameter of said round wire.

3. The motor apparatus according to claim 1, wherein said electric wire is a rectangular wire, and said circumferential width of said brim portion is smaller than or equal to 0.75 times a length of a side of said rectangular wire facing said brim portion.

4. The motor apparatus according to claim 3, wherein corners of said rectangular wire are rounded.

5. The motor apparatus according to claim 1, wherein said DC ends of said multi-phase inverter include a DC high voltage end and a DC low voltage end, said DC power supply is connected to said neutral point of said stator winding at a positive terminal thereof and connected to said DC low voltage end at a negative terminal thereof, and said control section controls said multi-phase inverter such that a multi-phase AC current containing a DC component offset to a negative side flows through said stator winding.

6. The motor apparatus according to claim 1, wherein said DC ends of said multi-phase inverter include a DC high voltage end and a DC low voltage end, said DC power supply is connected to said DC high voltage end at a positive terminal thereof and connected to said neutral point of said stator winding at a negative terminal thereof, and said control section controls said multi-phase inverter such that a multi-phase AC current containing a DC component offset to a positive side flows through said stator winding.

7. The motor apparatus according to claim 1, wherein said multiphase motor includes permanent magnets disposed on an outer periphery of said rotor, and radially magnetized to form said magnetic poles.

8. The motor apparatus according to claim 7, wherein said magnetic poles are skewed.

9. The motor apparatus according to claim 7, wherein said magnetic poles are 10 or 14 in number.

10. The motor apparatus according to claim 1, wherein said multiphase motor is a motor used in an electric power steering device.

11. The motor apparatus according claim 1, wherein a cross section of a space defined by the two of the brim portions has a trapezoidal shape that expands toward a radially outside of the rotor.

12. A motor apparatus with a voltage step-up function comprising:
   a capacitor;
   a multi-phase inverter including DC ends and AC ends, said DC ends being connected across said capacitor;
   a multi-phase motor including a rotor having a plurality of magnetic poles and a stator formed with tooth portions radially extending with a pitch equal to 5/6 times or 7/6 times a pole pitch of said rotor,
   each of said tooth portions being formed with a brim portion circumferentially extending from both circumferential sides of said tooth portion at one end of said tooth portion on the side facing said rotor,
   said stator having a stator winding including a plurality of star-connected phase windings each being constituted of electric wires concentratedly wound around said tooth portions, phase ends of said stator winding being connected respectively to said AC ends, the electric wires being wound around the tooth portions such that the electric wires are arranged of rows in a circumferential direction of the stator between two of the brim portions adjacent to one another;
   a DC power supply connected between one of said DC ends and a neutral point of said stator winding; and
   a control section which controls said multi-phase inverter such that a multi-phase AC current containing a DC component flows through said stator winding;
   wherein a circumferential width of said tooth portion including said brim portions at one end thereof facing said rotor is not larger than 1.13 times a circumferential width of said tooth portion at the other end thereof opposite to said rotor.

13. The motor apparatus according to claim 12, wherein said DC ends of said multi-phase inverter include a DC high voltage end and a DC low voltage end, said DC power supply is connected to said neutral point of said stator winding at a positive terminal thereof and connected to said DC low voltage end at a negative terminal thereof, and said control section controls said multi-phase inverter such that a multi-phase AC current containing a DC component offset to a negative side flows through said stator winding.

14. The motor apparatus according to claim 12, wherein said DC ends of said multi-phase inverter include a DC high voltage end and a DC low voltage end, said DC power supply is connected to said DC high voltage end at a positive terminal thereof and connected to said neutral point of said stator winding at a negative terminal thereof, and said control section controls said multi-phase inverter such that a multi-phase AC current containing a DC component offset to a positive side flows through said stator winding.

15. The motor apparatus according to claim 12, wherein said multiphase motor includes permanent magnets disposed on an outer periphery of said rotor, and radially magnetized to form said magnetic poles.

16. The motor apparatus according to claim 15, wherein said magnetic poles are skewed.

17. The motor apparatus according to claim 15, wherein said magnetic poles are 10 or 14 in number.

18. The motor apparatus according to claim 12, wherein said multi-phase motor is a motor used in an electric power steering device.

19. The motor apparatus according claim 12, wherein a cross section of a space defined by the two of the brim portions has a trapezoidal shape that expands toward a radially outside of the rotor.

20. A motor apparatus with a voltage step-up function comprising:
   a capacitor;
   a multi-phase inverter including DC ends and AC ends, said DC ends being connected across said capacitor;
   a multi-phase motor including a rotor having a plurality of magnetic poles and a stator formed with tooth portions radially extending with a pitch equal to 5/6 times or 7/6 times a pole pitch of said rotor,
   each of said tooth portions being formed with a brim portion circumferentially extending from both circumferential sides of said tooth portion at one end of said tooth portion on the side facing said rotor,
   said stator having a stator winding including a plurality of star-connected phase windings each being constituted of electric wires concentratedly wound around said tooth portions, phase ends of said stator winding being connected respectively to said AC ends, the electric wires being wound around the tooth portions such that the electric wires are arranged in a plurality of rows in a circumferential direction of the stator between two of the brim portions adjacent to one another;
   a DC power supply connected between one of said DC ends and a neutral point of said stator winding; and
   a control section which controls said multi-phase inverter such that a multiphase AC current containing a DC component flows through said stator winding;
   wherein a circumferential width of an opening between said brim portions circumferentially adjacent to each other is larger than or equal to 3 times a radial size of a clearance between said surface of said rotor and an end surface of said tooth portion.

21. The motor apparatus according to claim 20, wherein said DC ends of said multi-phase inverter include a DC high voltage end and a DC low voltage end, said DC power supply is connected to said neutral point of said stator winding at a positive terminal thereof and connected to said DC low voltage end at a negative terminal thereof, and said control section controls said multi-phase inverter such that a multi-phase AC current containing a DC component offset to a negative side flows through said stator winding.

22. The motor apparatus according to claim 20, wherein said DC ends of said multi-phase inverter include a DC high voltage end and a DC low voltage end, said DC power supply is connected to said DC high voltage end at a positive terminal thereof and connected to said neutral point of said stator winding at a negative terminal thereof, and said control section controls said multi-phase inverter such that a multi-phase AC current containing a DC component offset to a positive side flows through said stator winding.

23. The motor apparatus according to claim 20, wherein said multiphase motor includes permanent magnets disposed on an outer periphery of said rotor, and radially magnetized to form said magnetic poles.

24. The motor apparatus according to claim 23, wherein said magnetic poles are skewed.

25. The motor apparatus according to claim 23, wherein said magnetic poles are 10 or 14 in number.

26. The motor apparatus according to claim 20, wherein said multiphase motor is a motor used in an electric power steering device.

27. The motor apparatus according claim 20, wherein a cross section of a space defined by the two of the brim portions has a trapezoidal shape that expands toward a radially outside of the rotor.

* * * * *